United States Patent
Oami et al.

(10) Patent No.: US 9,235,754 B2
(45) Date of Patent: Jan. 12, 2016

(54) PERSON TRACKING DEVICE, PERSON TRACKING METHOD, AND NON-TRANSITORY COMPUTER READABLE MEDIUM STORING PERSON TRACKING PROGRAM

(75) Inventors: Ryoma Oami, Tokyo (JP); Yusuke Takahashi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 105 days.

(21) Appl. No.: 14/001,251

(22) PCT Filed: Oct. 26, 2011

(86) PCT No.: PCT/JP2011/005973
§ 371 (c)(1),
(2), (4) Date: Aug. 23, 2013

(87) PCT Pub. No.: WO2012/131816
PCT Pub. Date: Oct. 4, 2012

(65) Prior Publication Data
US 2013/0329958 A1 Dec. 12, 2013

(30) Foreign Application Priority Data
Mar. 28, 2011 (JP) ................................. 2011-070114

(51) Int. Cl.
G06K 9/00 (2006.01)
G06T 7/20 (2006.01)

(52) U.S. Cl.
CPC .............. *G06K 9/00369* (2013.01); *G06T 7/20* (2013.01); *G06T 2207/30196* (2013.01); *G06T 2207/30232* (2013.01); *G06T 2207/30242* (2013.01)

(58) Field of Classification Search
None
See application file for complete search history.

(56) References Cited

U.S. PATENT DOCUMENTS

2006/0166020 A1 7/2006 Raybould et al.
2012/0127304 A1* 5/2012 Tsuji et al. ................... 348/135

FOREIGN PATENT DOCUMENTS

CN 1695167 A 11/2005
CN 101582166 A 11/2009
(Continued)

OTHER PUBLICATIONS

Communication dated Dec. 3, 2014 from the Russian Patent Office in counterpart application No. 2013147808.
(Continued)

*Primary Examiner* — Atiba O Fitzpatrick
(74) *Attorney, Agent, or Firm* — Sughrue Mion, PLLC

(57) ABSTRACT

A person region information extraction unit (101) detects a person region where a person appearing in a video belongs, and generates person region information describing information of the person region. An accompanying person determination unit (102) identifies at least one accompanying person accompanying a tracking target person among persons included in the person region information based on the person region information and information specifying a tracking target person, and generates accompanying person information describing the accompanying person. A distinctive person selection unit (103) selects a distinctive person having a salient feature using the person region information among the accompanying person specified by the accompanying person information, and generates distinctive person information describing the distinctive person. A person tracking unit (104) calculates a tracking result for the distinctive person based on the person region information and the distinctive person information.

10 Claims, 9 Drawing Sheets

(56) References Cited

FOREIGN PATENT DOCUMENTS

| | | |
|---|---|---|
| JP | 2005-250692 A | 9/2005 |
| JP | 2006-092396 A | 4/2006 |
| JP | 2008-117264 A | 5/2008 |
| JP | 2009-075802 A | 4/2009 |
| RU | 2370817 C2 | 10/2009 |
| RU | 2408162 C2 | 12/2010 |
| WO | 2006/080367 A1 | 8/2006 |
| WO | WO2010143290 * 12/2010 | ............... H04N 7/18 |

OTHER PUBLICATIONS

Communication dated May 6, 2015 from the State Intellectual Property Office of the P.R.C. In counterpart application No. 201180069391.7.

* cited by examiner

PERSON TRACKING DEVICE, PERSON TRACKING METHOD, AND NON-TRANSITORY COMPUTER READABLE MEDIUM STORING PERSON TRACKING PROGRAM

CROSS REFERENCE TO RELATED APPLICATIONS

This application is a National Stage of International Application No. PCT/JP2011/005973 filed Oct. 26, 2011, claiming priority based on Japanese Patent Application No. 2011-070114, filed Mar. 28, 2011, the contents of all of which are incorporated herein by reference in their entirety.

TECHNICAL FIELD

The present invention relates to a person tracking device, a person tracking method, and a non-transitory computer readable medium storing a person tracking program and, particularly, to a person tracking device, a person tracking method, and a non-transitory computer readable medium storing a person tracking program that track a person using a video taken by a surveillance camera.

BACKGROUND ART

Techniques to track a person using a video taken by a surveillance camera are disclosed in recent years. As one example of a person tracking method, Patent Literature 1 discloses a method of tracking a person based on a color feature of a person.

FIG. 9 shows an exemplary embodiment of the person tracking system disclosed in Patent Literature 1. The person tracking system includes a person region extraction means 1, a voxel generation means 2, a person color feature extraction means 3, and a person tracking means 4.

The person region extraction means 1 extracts a person region from a surveillance video and outputs a person region extraction result to the voxel generation means 2. The voxel generation means 2 generates voxel information from the person region extraction result output from the person region extraction means 1 and outputs the generated voxel information to the person color feature extraction means 3. The person color feature extracting means 3 extracts a person color feature from the voxel information output from the voxel generation means 2 and the surveillance video and outputs the extracted person color feature to the person tracking means 4. The person tracking means 4 tracks a person using the person color feature output from the person color feature extracting means 3 and outputs a person tracking result.

The operation of the person tracking system shown in FIG. 9 is described in detail.

The person region extraction means 1 extracts a person region from a surveillance video input from a camera using a background subtraction method. Then, the person region extraction means 1 outputs the extracted person region extraction result to the voxel generation means 2.

The voxel generation means 2 generates voxels based on the input person region extraction result. The input person region extraction result is acquired by a plurality of cameras. The voxel generation means 2 projects the input person region extraction result onto the three-dimensional space using a volume intersection method and thereby generates voxels that represent the position of a person in the space. The voxel generation means 2 outputs the generated voxels to the person color feature extracting means 3.

The person color feature extracting means 3 acquires the distribution of colors of a person from toe to tip in the vertical direction as a person color feature based on the generated voxels and the surveillance camera video. Specifically, the person color feature extracting means 3 calculates the average of colors for each height of the voxel, normalizes the result by height, and thereby calculates the person color feature. Although the color feature is basically determined by the color of clothes the person is wearing, the value obtained by calculating the average of colors in all directions at the same height is used. The person color feature extracting means 3 thereby achieves the extraction of the color feature that is robust against variation of the way the clothes look depending on the direction.

The person tracking means 4 compares the obtained person color feature with a person color feature obtained in the past and thereby determines the similarity. The person tracking means 4 calculates the relationship between the voxels calculated in the past and the voxels calculated most recently in accordance with the determination result. Consequently, the person tracking means 4 calculates a person tracking result associating the past person extraction result and the current extraction result.

CITATION LIST

Patent Literature

PTL1: Japanese Unexamined Patent Application Publication No. 2005-250692

SUMMARY OF INVENTION

Technical Problem

In the person tracking system disclosed in Patent Literature 1, the tracking of a tracking target person is difficult when there is no distinctive feature in the clothes the tracking target person is wearing. The clothes are similar in general. When there are many persons who are wearing the clothes in the similar color to the clothes the tracking target person is wearing, the probability that the person tracking system confuses the tracking target person with another similar person increases, which makes accurate tracking difficult. Particularly, in the case of tracking a person using surveillance cameras with no overlap in their fields of view, once a tracking target person enters the blind spot of the camera and the tracking is discontinued temporarily, it is difficult for the person tracking system disclosed in Patent Literature 1 to correctly track the tracking target person even after the person comes back into the viewing range of the camera.

The present invention has been accomplished to solve the above problems and an exemplary object of the present invention is thus to provide a person tracking device, a person tracking method, and a non-transitory computer readable medium storing a person tracking program that can achieve accurate tracking of a tracking target person even when the tracking target person has few distinctive features.

Solution to Problem

A person tracking device according to one aspect of the invention includes a person region information extraction means for detecting a person region where a person appearing in a video belongs, and generating person region information describing information of the person region; an accompanying person determination means for identifying at least one accompanying person accompanying a tracking target person among persons included in the person region information based on the person region information and information specifying a tracking target person, and generating accompanying person information describing the accompanying person; a distinctive person selection means for selecting a distinctive person having a salient feature using the person region information among the accompanying person specified by the accompanying person information, and generating distinctive person information describing the distinctive person; and a person tracking means for calculating a distinctive person tracking result being a tracking result for the distinctive person based on the person region information and the distinctive person information.

A person tracking method according to one aspect of the invention includes detecting a person region where a person appearing in a video belongs, and generating person region information describing information of the person region; identifying at least one accompanying person accompanying a tracking target person among persons included in the person region information based on the person region information and information specifying a tracking target person, and generating accompanying person information describing the accompanying person; selecting a distinctive person having a salient feature using the person region information among the accompanying person specified by the accompanying person information, and generating distinctive person information describing the distinctive person; and calculating a distinctive person tracking result being a tracking result for the distinctive person based on the person region information and the distinctive person information.

A non-transitory computer readable medium storing a person tracking program according to one aspect of the invention is a non-transitory computer readable medium storing a program causing a computer to execute a process of tracking a person appearing in a video, the process including detecting a person region where the person appearing in the video belongs, and generating person region information describing information of the person region; identifying at least one accompanying person accompanying a tracking target person among persons included in the person region information based on the person region information and information specifying a tracking target person, and generating accompanying person information describing the accompanying person; selecting a distinctive person having a salient feature using the person region information among the accompanying person specified by the accompanying person information, and generating distinctive person information describing the distinctive person; and calculating a distinctive person tracking result being a tracking result for the distinctive person based on the person region information and the distinctive person information.

Advantageous Effects of Invention

According to the aspects of the invention, it is possible to provide a person tracking device, a person tracking method, and a non-transitory computer readable medium storing a person tracking program that can achieve accurate tracking of a tracking target person even when the tracking target person has few distinctive features.

DESCRIPTION OF EMBODIMENTS

First Exemplary Embodiment

Figure 1:
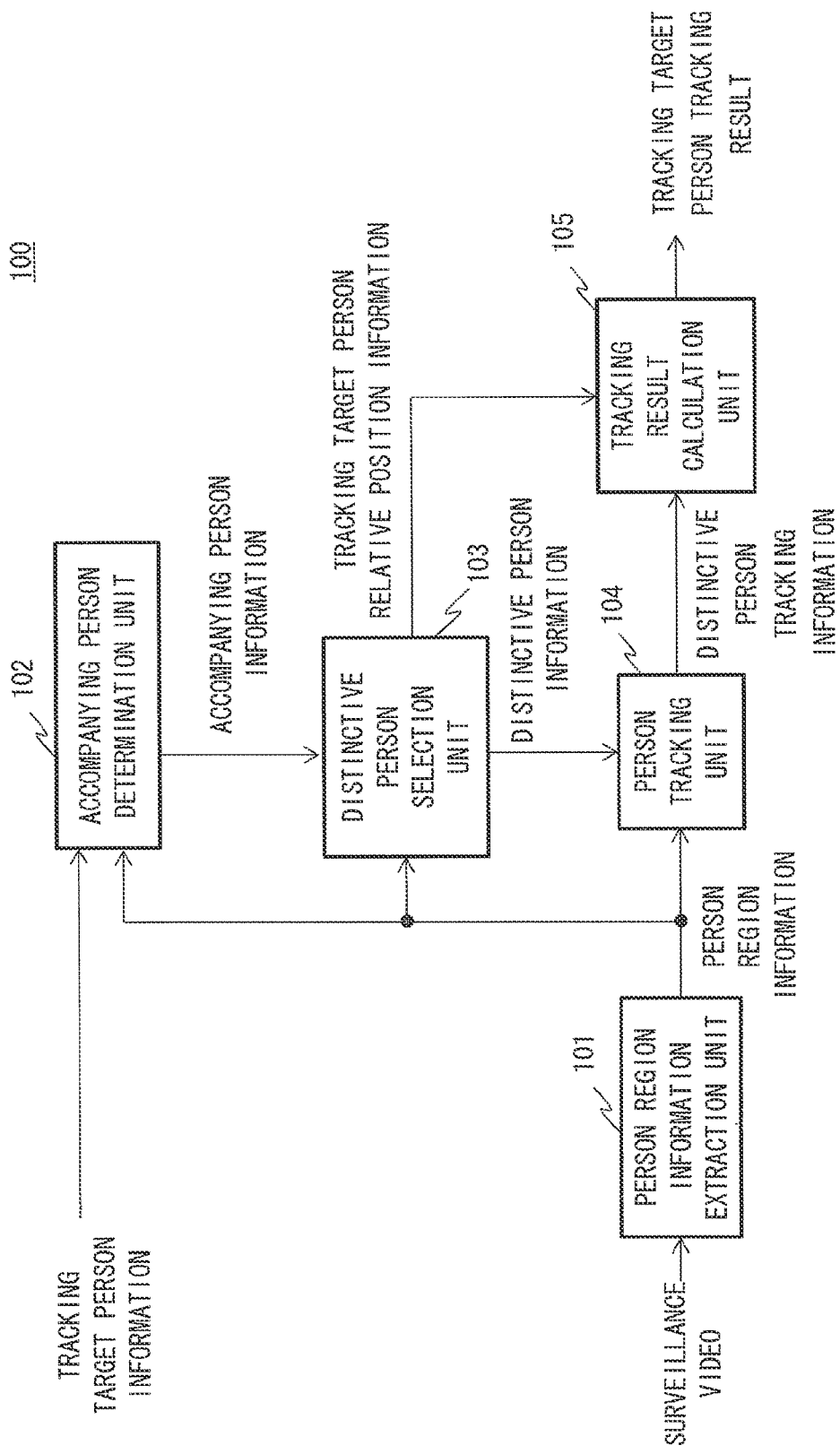
FIG. 1 is a block diagram showing a configuration of a person tracking device according to a first exemplary embodiment.

Exemplary embodiments of the present invention are described hereinafter with reference to the drawings. FIG. 1 is a block diagram showing a configuration of a person tracking device according to this exemplary embodiment. The person tracking device 100 includes a person region information extraction unit 101, an accompanying person determination unit 102, a distinctive person selection unit 103, a person tracking unit 104, and a tracking result calculation unit 105.

The person region information extraction unit 101 receives a surveillance video, and outputs extracted person region information to the accompanying person determination unit 102, the distinctive person selection unit 103 and the person tracking unit 104. The accompanying person determination unit 102 receives the person region information output from the person region information extraction unit 101 and tracking target person information, and outputs calculated accompanying person information to the distinctive person selection unit 103. The distinctive person selection unit 103 receives the person region information output from the person region information extraction unit 101 and the accompanying person information output from the accompanying person determination unit 102, and outputs calculated distinctive person information to the person tracking unit 104 and outputs calculated tracking target person relative position information to the tracking result calculation unit 105. The person tracking unit 104 receives the person region information output from the person region information extraction unit 101 and the distinctive person information output from the distinctive person selection unit 103, and outputs calculated distinctive person tracking information to the tracking result calculation unit 105. The tracking result calculation unit 105 receives the distinctive person tracking information output from the person tracking unit 104 and the tracking target person relative position information output from the distinctive person selection unit 103, and calculates and outputs a tracking target person tracking result to a given processing unit.

The detailed operation of the person tracking device shown in FIG. 1 is described hereinafter.

First, a surveillance video is input to the person region information extraction unit 101. The person region information extraction unit 101 generates a frame image from the input surveillance video. The person region information extraction unit 101 then performs processing of extracting a person region from the frame image and further performs processing of extracting person region information describing the person region. When the input surveillance video is an analog video, the person region information extraction unit 101 captures the surveillance video and thereby generates the frame image. On the other hand, when the surveillance video is a digital video encoded by H.264, Motion JPEG, MPEG-2 or the like, the person region information extraction unit 101 decodes the video by a corresponding decoding method and thereby generates the frame image.

The processing of extracting the person region by the person region information extraction unit 101 may be performed using various existing methods. For example, in the extraction of the person region based on background subtraction, the person region information extraction unit 101 constructs a model representing information of a background from frame images input in time series, extracts a moving object using the model, and then extracts the person region from the extracted information. As the simplest way, the person region information extraction unit 101 defines a background image generated by taking the average of information of an image in a still region among a plurality of images as a background model, calculates a difference between the frame image and the background image, and extracts a region with a larger difference as the moving object. When the moving object is limited to a person, the person region information extraction unit 101 may use the moving object extraction result as it is as the person region extraction result. On the other hand, when there is a moving object different from a person, the person region information extraction unit 101 may make determination as to whether the extracted moving object region corresponds to a person or not and then extract only the region that is likely to be a person as the person region.

The person region information extraction unit 101 may extract the person region directly using a person model, without using the background model. The person model used herein may be a model representing the whole of a person or a part of a person. For example, the person region information extraction unit 101 may detect a face or a head using a face detector or a head detector that models and extracts a face or a head as a part of a person and define the person region from the detection result. Alternatively, the person region information extraction unit 101 may extract the person region using a detector that detects a part of the person region such as an upper body or a lower body.

The person region information extraction unit 101 extracts person region information from the person region extracted by the above method. The person region information is information representing a distinctive feature of the extracted person region. The person region information includes information representing the position or shape of a person region on the image and information describing the distinctive features of a person included in the region specified by the information.

The former (information representing the position or shape of a person region on the image) may be outline information representing the shape of a person (information where a label is assigned to pixels corresponding to the person region), rectangular information representing the bounding rectangle of the person region, or any information representing the position or shape of the person region in the same manner. For example, the region information may be represented using a descriptor describing a region defined by MPEG-7.

On the other hand, the latter (information describing the distinctive features of a person included in the specified region) may be information describing various features from image features included in the region to high-level features of the person. Examples of the information include a feature representing the facial feature of a person, a feature representing the hair color, hairstyle or hair feature, a visual feature representing the color, pattern or shape of clothes, information representing the type of clothes, accessories of a person (those worn by a person such as a hat, glasses, mask, handbag, tie or scarf), information representing a specific mark or logo on clothes, and information representing a skin color.

The facial feature can be calculated using a face detector and facial feature extraction used heretofore. The feature of clothes is calculated by specifying the region of clothes from the person region and extracting information describing the region. As the feature extraction of a color, pattern and shape, various existing methods (such as the method describing a color, pattern and shape specified in MPEG-7, for example) may be used. The information describing accessories of a person is calculated by detecting accessories using a detector that detects an object from a head or a specific part of a body and extracting information describing the region. A specific mark or logo on clothes can be detected using a discriminator that has learned those patterns. The specific mark or logo is also calculated by extracting information describing the feature or discrimination result from the detected region. The skin color can be also extracted by estimating a skin region from the person region and obtaining the color of that part.

Besides, higher-level features may be contained in the latter information (information describing the distinctive features of a person included in the specified region). For example, information about the height of a person may be used as the feature. The person height information may be calculated from a three-dimensional position of a person in the real world which is calculated from a two-dimensional position of an image acquired by a camera using calibration data of the camera. Further, information about the body type of a person may be extracted in the same manner and used as the feature. Furthermore, information about the age and gender of a person may be extracted using an age/gender estimator, and the extracted information may be used as the feature. Further, information describing the posture of a person such as sitting on a wheelchair, carrying a child or walking with a stick may be extracted using a discriminator that determines a specific posture such as a person's sitting posture on a wheelchair and used as the feature. Furthermore, a gait feature, which is the feature of the way of walking, may be calculated and used as the feature. A discriminator that discriminates a specific posture or classifies the gait feature can be constructed by making it learned using a learning image.

The person region information extraction unit 101 outputs the extracted person region information to the accompanying person determination unit 102, the distinctive person selection unit 103, and the person tracking unit 104.

The operation of the accompanying person determination unit 102 is described hereinafter. The accompanying person determination unit 102 determines an accompanying person of a tracking target person from the input tracking target person information and the person region information output from the person region information extraction unit 101, and outputs the determination result as accompanying person information. There are broadly two methods of determining an accompanying person: a method that specifies a tracking target person and then specifies an accompanying person, and a method that specifies a group including a tracking target person and then specifies a tracking target person.

Figure 2:
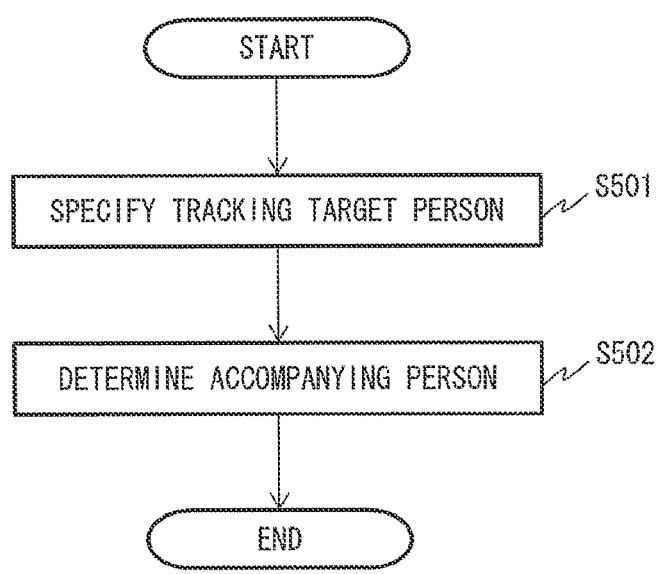
FIG. 2 is a flowchart showing a flow of processing of an accompanying person determination unit 102 according to the first exemplary embodiment.

In the method that specifies a tracking target person and then specifies an accompanying person, the accompanying person determination unit 102 identifies a tracking target person by some method and then determines a person present around the tracking target person as an accompanying person. This process is described with reference to FIG. 2.

First, the accompanying person determination unit 102 specifies a tracking target person from the tracking target person information and the person region information (S501). When the tracking target person information contains a facial feature of a tracking target person and the person region information contains a facial feature of a person, the accompanying person determination unit 102 checks the facial feature of the tracking target person against the facial feature in the person region information and thereby identifies the tracking target person. When the tracking target person information contains position information obtained by another sensor information such as RFID, the accompanying person determination unit 102 checks it against person position information contained in the person region information and identifies a person whose position substantially coincides as the tracking target person. Note that the process of identifying a tracking target person is not always executable in all frames and thus executed in a feasible frame.

Next, the accompanying person determination unit 102 determines an accompanying person of the identified tracking target person (S502). In the determination of an accompanying person (S502), the accompanying person determination unit 102 determines that a person is an accompanying person when the distance between the identified tracking target person and each person contained in the person region information on the image is within a specified threshold in a specified amount of time. Specifically, the accompanying person determination unit 102 tracks the movement of each person based on the input person region information for several frames from the frame where the tracking target person is identified and calculates the distance between the tracking target person and the other persons in each of the frames. When the distance is within a specified threshold, the accompanying person determination unit 102 determines that person as an accompanying person. The accompanying person determination unit 102 does not necessarily determine only the person whose distance is always within the threshold during the tracking period as an accompanying person, and it may determine the person whose distance is within the threshold at a specified rate or more as an accompanying person.

Alternatively, the accompanying person determination unit 102 calculates position information of each person in the real world using calibration information of a camera used for association between the two-dimensional coordinates in the image and the three-dimensional coordinates in the real world and the position of the person in the image. The accompanying person determination unit 102 may then determine an accompanying person of the tracking target person using the position information of each person.

Alternatively, the accompanying person determination unit 102 selects a person whose distance is within a specified threshold in the frame where the tracking target person is identified as a candidate for an accompanying person. The accompanying person determination unit 102 may then calculate the movement of the candidate for an accompanying person and determine whether the candidate is moving in the same direction as the tracking target person at substantially the same speed and thereby determine whether that person is an accompanying person or not.

The accompanying person determination unit 102 generates accompanying person information as a processing result of the determination of an accompanying person (S502). The accompanying person information is information that specifies information corresponding to a person who is an accompanying person of the tracking target person among the information of persons contained in the person region information. For example, the accompanying person information sets a flag indicating whether each of the persons contained in the person region information is an accompanying person or not, the flag with a value of 1 indicating an accompanying person or otherwise indicating not an accompanying person. Alternatively, the accompanying person information may indicate the determination result by three values, including the state where it is unknown whether the person is an accompanying person or not. The accompanying person information is information that contains information specifying a tracking target person as well. The calculation of the accompanying person information is performed only when a tracking target person can be specified.

Figure 3:
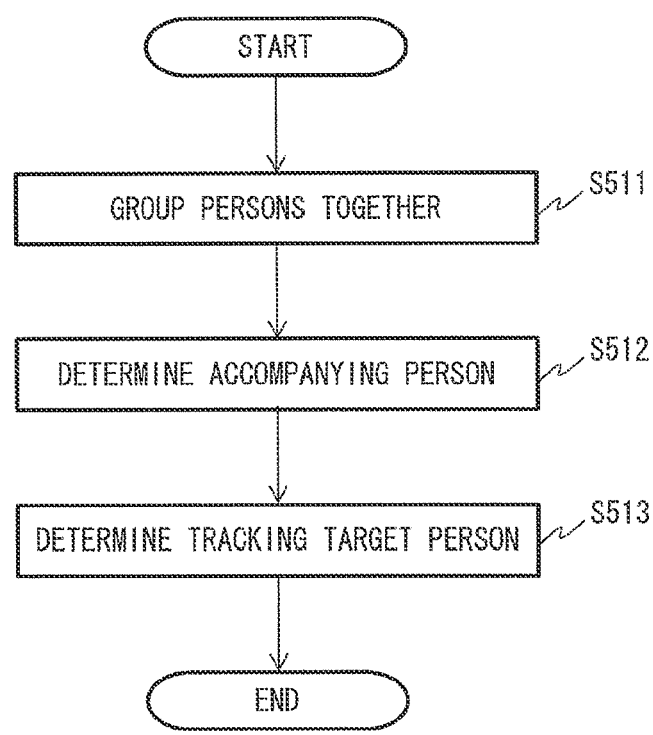
FIG. 3 is a flowchart showing a flow of processing of the accompanying person determination unit 102 according to the first exemplary embodiment.

Next, the method that specifies a group including a tracking target person and then specifies a tracking target person is described. The accompanying person determination unit 102 calculates a group of persons estimated to include a tracking target person and then determines an accompanying person from the group. This process is described with reference to the flowchart of FIG. 3.

The accompanying person determination unit 102 groups the persons close to each other together based on the position information of persons included in the person region information (S511). In this step, the accompanying person determination unit 102 may use the positions on the image or may calculate the positions of persons in the real world using calibration information of a camera as described above and use the calculated position information.

Next, the accompanying person determination unit 102 determines accompanying persons (S512). When the tracking target person information includes the position information of a tracking target person obtained by other information such as sensor information, the accompanying person determination unit 102 selects the group that is most likely to include a tracking target person. The accompanying person determination unit 102 generates accompanying person information from the selected group.

Then, the accompanying person determination unit 102 determines a tracking target person (S513). When the tracking target person information includes information that can specify a tracking target person (the facial feature, the visual feature of clothes etc.), the accompanying person determination unit 102 selects the person who is likely to be a tracking target person among the accompanying persons. The accompanying person determination unit 102 then adds information specifying the tracking target person to the accompanying person information. The determination is not necessarily made for each frame and may be made only when a group that is likely to include a tracking target person can be specified.

The accompanying person information (that can include information of a tracking target person) that is obtained principally by any of the above two methods is output to the distinctive person selection unit 103.

The distinctive person selection unit 103 is described hereinafter. The distinctive person selection unit 103 calculates distinctive person information and tracking target person relative position information based on the person region information output from the person region information extraction unit 101 and the accompanying person information output from the accompanying person determination unit 102.

The distinctive person information is information representing which person is distinctive and can be easily tracked. For example, in the case where one person in red clothes is present in a group of persons in white clothes, the person in red clothes is dressed completely differently from the others. Therefore, when performing tracking using the color of clothes, the possibility that the person in red clothes is confused with the other persons is considered to be low. On the other hand, when tracking a person in white clothes, the possibility that the tracking results in failure is high because there are many other persons in white clothes. In this manner, the distinctive person selection unit 103 determines the easiness of tracking of each of the persons included in the person region information and selects a person with high easiness of tracking as a distinctive person. The details of the configuration and operation of the distinctive person selection unit 103 are described later.

The tracking target person relative position information is information representing the relative position between a tracking target person and a distinctive person selected from accompanying persons. For example, the tracking target person relative position information is vector information obtained by subtracting the position coordinates of a distinctive person from the position coordinates of a tracking target person. Alternatively, the tracking target person relative position information may be information roughly representing the relative positional relationship such as "a tracking target person is at the back of a distinctive person". Further alternatively, when there are a plurality of persons who are likely to be a tracking target person among those who are included in the accompanying person information, the relative position information may be a representative value (the average, a certain point etc.) of the coordinates calculated from those plurality of person information. The details of the relative position information are also described later.

The distinctive person selection unit 103 outputs the calculated distinctive person information to the person tracking unit 104, and outputs the calculated tracking target person relative position information to the tracking result calculation unit 105. Note that the number of distinctive persons is not limited to one, and a plurality of distinctive persons may exist.

The person tracking unit 104 is described hereinafter. The person tracking unit 104 calculates distinctive person tracking information that tracks a distinctive person from the person region information output from the person region information extraction unit 101 and the distinctive person information output from the distinctive person selection unit 103. A method of tracking may be any tracking method used heretofore. In the case of tracking a person within the same camera video, the person tracking unit 104 may perform tracking by a particle filter using the feature of clothes, for example. Alternatively, the person tracking unit 104 may perform tracking using a Kalman filter.

The case where surveillance videos taken by a plurality of cameras are input is described next. In the case of tracking using a plurality of cameras, when a person being tracked goes out of the field of view of the camera where the tracking is currently performed, the person tracking unit 104 predicts which nearby camera field the person goes next and at what time the person enters the field of view of the camera. Then, the person tracking unit 104 notifies information about the features of the person and the estimated arrival time at the field of view of the camera to the camera (or a control unit that controls the camera) where the tracking is performed next.

Receiving the information, the control unit of the next camera to perform tracking starts searching for the distinctive person a little before the estimated arrival time. Specifically, the control unit of the next camera to perform tracking compares the features of a person who comes into the field of view with the features of the distinctive person being tracked and determines whether there is a person with the matched features. When the tracking target person has come into the field of view of the camera, the person tracking unit 104 changes into the processing of tracking that person in that camera and thereby tracks the person. A method of tracking a person within the same camera is described earlier.

The person tracking unit 104 outputs the calculated tracking information for the distinctive person as distinctive person tracking information to the tracking result calculation unit 105.

The tracking result calculation unit 105 calculates a tracking target person tracking result from the distinctive person tracking information output from the person tracking unit 104 and the tracking target person relative position information output from the distinctive person selection unit 103.

Specifically, the tracking result calculation unit 105 calculates a person tracking result for the tracking target person by adding the tracking target person relative position information to the distinctive person tracking information. Note that, however, the tracking target person relative position information cannot be always calculated. Therefore, at the time when the tracking target person relative position information is not calculated, the tracking result calculation unit 105 may calculate the person tracking result by using the previous relative position information as it is or calculate the person tracking result by making prediction based on the previous relative position information.

Further, in the case where a delay is allowed for the output of the person tracking result, the tracking result calculation unit 105 stores the distinctive person tracking information into a buffer temporarily until the tracking target person relative position information is calculated next. Then, at the point of time when the next tracking target person relative position information is calculated, the tracking result calculation unit 105 calculates the relative position information at each time by interpolation using the calculated relative position information and the previous relative position information. The tracking result calculation unit 105 may calculate a person tracking result for the tracking target person using the distinctive person tracking information and the relative position information calculated by interpolation.

Figure 4:
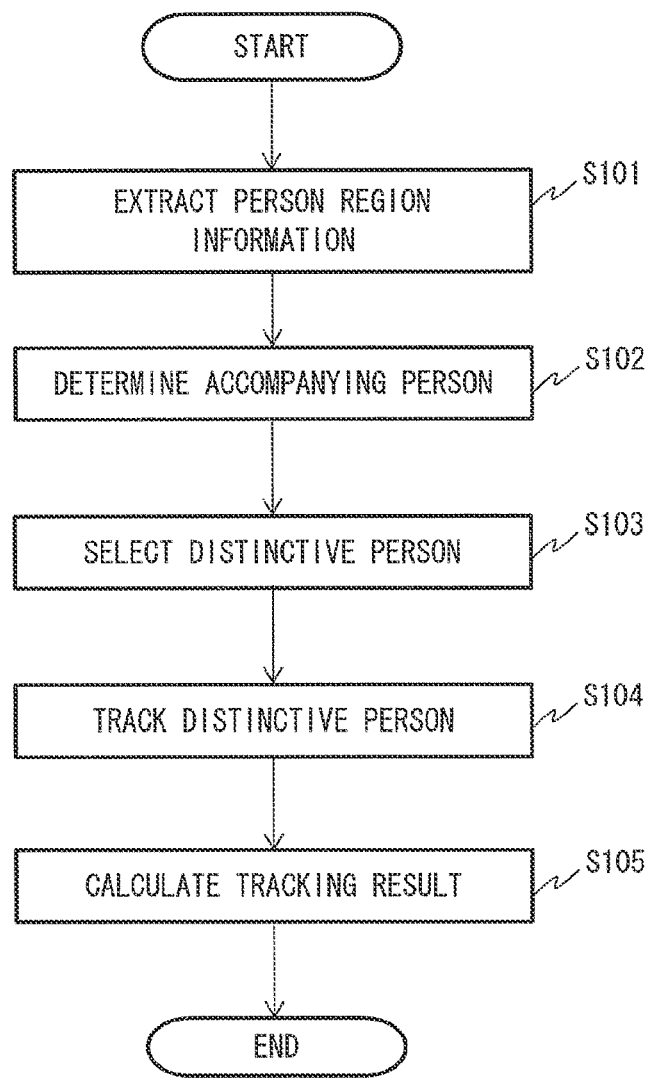
FIG. 4 is a flowchart showing a flow of processing of a person tracking device 100 according to the first exemplary embodiment.

The flow of operation of the person tracking device 100 shown in FIG. 1 is described hereinafter with reference to FIG. 4. FIG. 4 is a flowchart showing the operation of the person tracking device 100 according to this exemplary embodiment.

The person region information extraction unit 101 calculates person region information from a surveillance video (S101). The details of the calculation of the person region information are as described earlier in the description of the person region information extraction unit 101. Next, the accompanying person determination unit 102 calculates accompanying person information based on the person region information and the tracking target person information (S102). The details of the calculation of the accompanying person information are as described earlier in the description of the accompanying person determination unit 102. The distinctive person selection unit 103 calculates distinctive person information and tracking target person relative position information based on the person region information and the accompanying person information (S103). The calculation of those information is as described earlier in the description of the distinctive person selection unit 103. Then, the person tracking unit 104 calculates distinctive person tracking information from the person region information and the distinctive person information (S104). The calculation of the distinctive person tracking information is as described earlier in the description of the person tracking unit 104. Then, the tracking result calculation unit 105 calculates a tracking target person tracking result from the distinctive person tracking information and the tracking target person relative position information (S105). The details of the calculation of the tracking target person tracking result are as described earlier in the description of the tracking result calculation unit 105.

Figure 5:
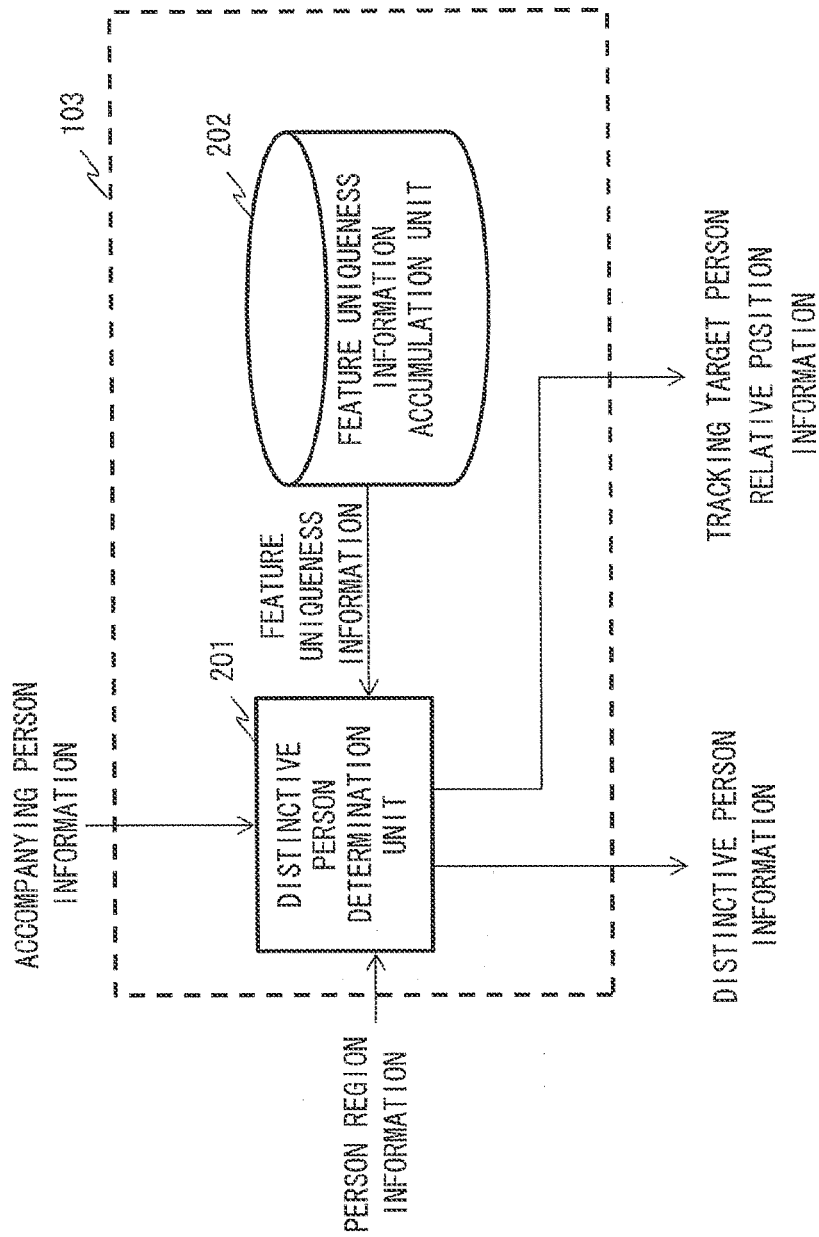
FIG. 5 is a block diagram showing a configuration of a distinctive person selection unit 103 according to the first exemplary embodiment.

The configuration of the distinctive person selection unit 103 is described hereinafter with reference to FIG. 5. FIG. 5 is a block diagram showing the configuration of the distinctive person selection unit 103 according to this exemplary embodiment.

The distinctive person selection unit 103 includes a distinctive person determination unit 201 and a feature saliency information accumulation unit 202.

The feature saliency information accumulation unit 202 accumulates feature saliency information and outputs it to the distinctive person determination unit 201. The distinctive person determination unit 201 receives the person region information, the accompanying person information, and the feature saliency information output from the feature saliency information accumulation unit 202, and calculates the distinctive person information and the tracking target person relative position information.

The specific operation of each processing unit of the distinctive person selection unit 103 shown in FIG. 5 is described hereinbelow. The feature saliency information accumulation unit 202 accumulates feature saliency information.

The feature saliency information is information representing the degree of saliency (the degree of distinction) of a value obtained as each feature representing the distinctive feature of a person. For example, in the case of the feature of the color of clothes, the saliency of the color of clothes commonly seen (for example, white) is low. On the other hand, the saliency of the color of clothes not commonly seen (for example, bright red) is high. A specific value of the saliency is calculated by a monotonically nonincreasing function with respect to the frequency of appearance of each feature value (the value of each color in the case of the color of clothes) calculated using learning data. For example, the value of self-information (which is $-\log_2 p$ when the frequency is p) may be calculated from the frequency, and the calculated value may be used as the saliency information. Alternatively, the value (for example, 1/p) corresponding to inverse document frequency used for document retrieval may be calculated, and the value may be used as the saliency information.

The saliency information may be changed for each season or time. Specifically, the feature saliency information accumulation unit 202 may change the feature saliency information to be accumulated for each season or time. For example, while people often wear black clothes during the winter, they often wear white clothes during the summer. Alternatively, while the frequency of jacket colors is high during the morning and evening because people often wear jackets of suits, the frequency of white clothes is high during the day because they often wear only dress shirts. In this manner, in the case where the frequency varies depending on the season or time, the saliency information may be changed according to the season or time. Further, in the case where the trend of the color of clothes differs depending on the place (for example, Okinawa and Hokkaido), the saliency information may be changed according to the place.

Likewise, in the case where the attribute of persons present in the area observed by a surveillance camera varies depending on the season, time or place, the saliency information may be changed accordingly. For example, in the case where the feature is information of a person's age, gender, height or the like and the area is where children are often seen during the day and adults are often seen during the night, while the saliency for a small age or height is low during the day, the saliency for a small age or height is high during the night. In this manner, the saliency information may be changed according to variation of the attribute of persons present in the area observed by a surveillance camera.

The feature saliency information is input to the distinctive person determination unit 201. Based on the feature saliency information, the distinctive person determination unit 201 calculates the saliency of feature data for a person designated by the accompanying person information in each person region included in the person region information. Then, the distinctive person determination unit 201 determines a person with high saliency as a distinctive person and outputs information specifying the person as distinctive person information to the person tracking unit 104.

Figure 6:
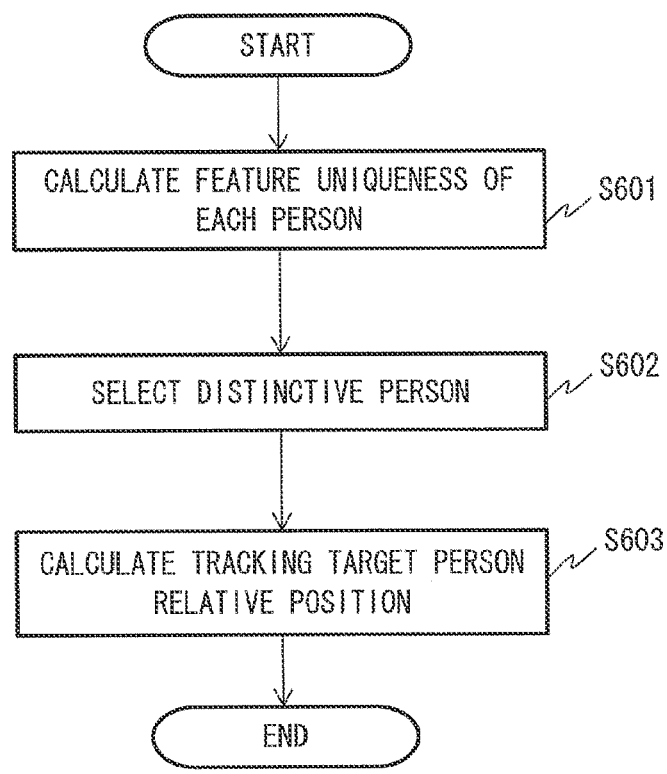
FIG. 6 is a flowchart showing a flow of processing of a distinctive person determination unit 201 according to the first exemplary embodiment.

The process of the distinctive person determination unit 201 is described hereinafter with reference to the flowchart of FIG. 6.

The distinctive person determination unit 201 calculates the saliency of the feature of each person from the feature of each person contained in the person region information (S601). When the value of saliency corresponding to the value of person feature contained in the person region information is included in the feature saliency information, the distinctive person determination unit 201 uses that value as the saliency of each person. On the other hand, when the value of saliency corresponding to the value of person feature contained in the person region information is not included in the feature saliency information, the distinctive person determination unit 201 calculates the one similar to the value of feature contained in the person region information among the values of feature quantities for which the value of saliency can be acquired. Then, the distinctive person determination unit 201 estimates the value of saliency from the similar value of saliency. For example, the distinctive person determination unit 201 may use the value of saliency as it is or calculate a plurality of similar feature quantities and takes the average of the values of saliency for those feature quantities.

By using the saliency data calculated in the above process, the distinctive person determination unit 201 can easily and stably select a person with high saliency in the process described later. Further, by appropriately changing the saliency information according to conditions such as time, season or place, the distinctive person determination unit 201 can select a distinctive person suitable for conditions.

The distinctive person determination unit 201 selects a person with high saliency (S602). The distinctive person determination unit 201 may select one person having the highest saliency or may select all persons having saliency of a certain threshold or higher.

When the accompanying person information includes information specifying a tracking target person also, the distinctive person determination unit 201 calculates a difference between the position of the tracking target person and the position of the person selected as a distinctive person and outputs the difference as the tracking target person relative position information to the tracking result calculation unit 105 (S603). When a plurality of persons are determined to be distinctive persons, the tracking target person relative position information contain differences from each of those persons.

The advantageous effects of the person tracking device 100 according to this exemplary embodiment are described hereinafter. In general, people act in groups. Therefore, when there are no many distinctive features on a person to be tracked, it is effective to track an accompanying person instead. The person tracking device 100 specifies accompanying persons of a tracking target person, selects a distinctive person who is distinctive in appearance among the accompanying persons, and tracks the distinctive person. The person tracking device 100 can thereby achieve accurate tracking even in the case of tracking a tracking target person with less distinctive features.

Further, because the person tracking device 100 calculates the position information of the distinctive person and further calculates the relative position information between the distinctive person and the tracking target person, the person tracking device 100 can calculate the precise position information of the tracking target person.

Second Exemplary Embodiment

A person tracking device according to a second exemplary embodiment is different from the person tracking device according to the first exemplary embodiment in the configuration of the distinctive person selection unit 103. Differences of the person tracking device according to this exemplary embodiment from that of the first exemplary embodiment are described hereinbelow.

Figure 7:
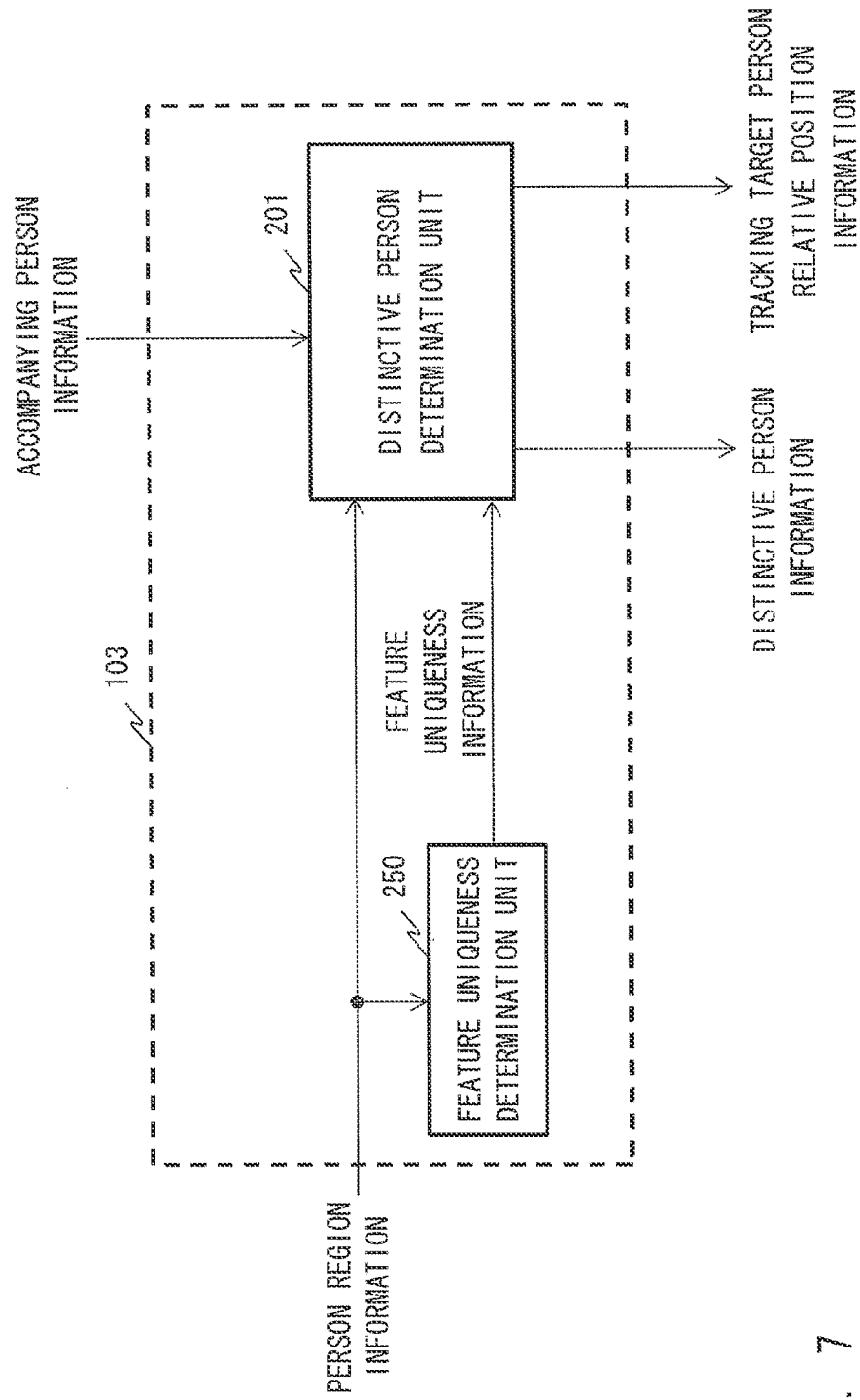
FIG. 7 is a block diagram showing a configuration of a distinctive person selection unit 103 according to a second exemplary embodiment.

FIG. 7 is a block diagram showing the configuration of the distinctive person selection unit 103 according to this exemplary embodiment. The distinctive person selection unit 103 includes a feature saliency determination unit 250 and the distinctive person determination unit 201.

The feature saliency determination unit 250 receives the person region information and calculates feature saliency information, and outputs the calculated feature saliency information to the distinctive person determination unit 201. The distinctive person determination unit 201 receives the person region information, the accompanying person information and the feature saliency information output from the feature saliency determination unit 250, and outputs the distinctive person information and the tracking target person relative position information.

The detailed operation of the distinctive person selection unit 103 shown in FIG. 7 is described next. The person region information is input to the feature saliency determination unit 250. The feature saliency determination unit 250 acquires the feature of each person region from the person region information and calculates the saliency of the value of the feature. For example, in the case where the feature is the color of clothes, the feature saliency determination unit 250 counts the number of colors of clothes contained in each person region information and calculates the frequency of appearance of each color, and then calculates the saliency in accordance with the frequency of appearance. The frequency of appearance may be calculated using only the person information of the current frame or using all features of persons that have appeared up to the present.

Alternatively, the feature saliency determination unit 250 may calculate the frequency of appearance using only the information of persons who have appeared in a specified amount of time from the present. The feature saliency determination unit 250 may calculate the frequency of appearance by assigning a weight that is smaller as being farther in time from the present to the past data. Alternatively, the feature saliency determination unit 250 may calculate the frequency of appearance using the past data that is different in date but close in time, and may calculate the frequency of appearance using the data of the same season only.

The feature saliency determination unit 250 may calculate the frequency of appearance by assigning a weight that is smaller as being farther in season or time from the time of the current frame. Further, the feature saliency determination unit 250 may calculate the frequency of appearance by aggregating information of person regions detected by a plurality of cameras. In this case, the feature saliency determination unit 250 may calculate the frequency of appearance by assigning a weight that is larger as the physical positions of the cameras are closer.

Then, the feature saliency determination unit 250 calculates the saliency information of each person from the calculated frequency of appearance. A calculation method for the saliency information is the same as the calculation method on the basis of learning data, which is described in the description of the feature saliency information accumulation unit 202 shown in FIG. 5.

The feature saliency information obtained in the above manner is input to the distinctive person determination unit 201. The operation of the distinctive person determination unit 201 is the same as that of the distinctive person determination unit 201 shown in FIG. 5.

By the above process, the distinctive person selection unit 103 calculates the frequency of appearance of each feature using the actually input surveillance video and then calculates the saliency of each person. The distinctive person selection unit 103 can thereby calculate the saliency that is most suitable for the place where a camera is located or time and improve the validity of selection of a distinctive person. Improvement of the validity of selection of a distinctive person allows improvement of the tracking accuracy of a tracking target person. Further, even when information of saliency varies with time, the person tracking device according to this exemplary embodiment can appropriately track a tracking target person.

Third Exemplary Embodiment

A person tracking device according to a third exemplary embodiment is characterized in that the feature saliency information accumulation unit 202 and the feature saliency determination unit 250 described above are included in the distinctive person selection unit 103. Differences of the person tracking device according to this exemplary embodiment from those of the first and second exemplary embodiments are described hereinbelow.

Figure 8:
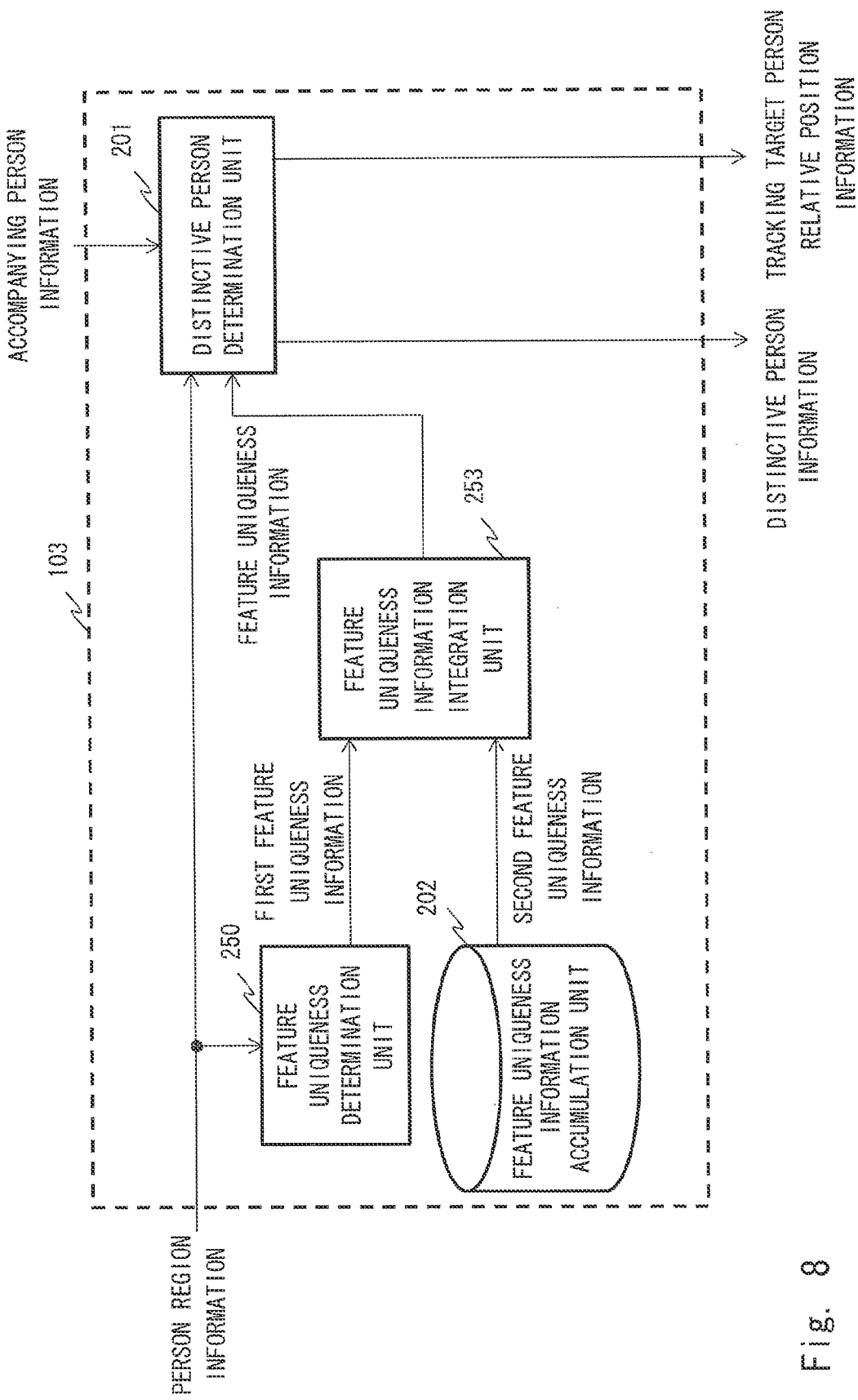
FIG. 8 is a block diagram showing a configuration of a distinctive person selection unit 103 according to a third exemplary embodiment.
Figure 9:
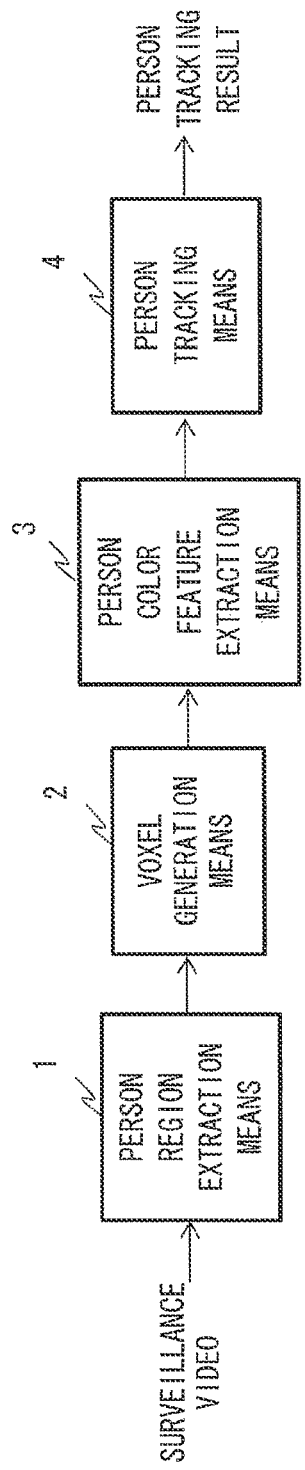
FIG. 9 is a block diagram showing a configuration of a person tracking system disclosed in Patent Literature 1.

FIG. 8 is a block diagram showing the configuration of the distinctive person selection unit 103 according to this exemplary embodiment. The distinctive person selection unit 103 includes the feature saliency determination unit 250, the feature saliency information accumulation unit 202, a feature saliency information integration unit 253, and the distinctive person determination unit 201.

The feature saliency determination unit 250 receives the person region information and outputs first feature saliency information to the feature saliency information integration unit 253. The feature saliency information accumulation unit 202 outputs the accumulated feature saliency information as second feature saliency information to the feature saliency information integration unit 253.

The feature saliency information integration unit 253 receives the first feature saliency information output from the feature saliency determination unit 250 and the second feature saliency information output from the feature saliency information accumulation unit 202, and outputs calculated feature saliency information to the distinctive person determination unit 201.

The distinctive person determination unit 201 receives the person region information, the accompanying person information and the feature saliency information output from the feature saliency information integration unit 253, and outputs the distinctive person information and the tracking target person relative position information.

The details of the operation of the distinctive person selection unit 103 shown in FIG. 8 are described hereinbelow. The operation of the feature saliency information accumulation unit 202 is the same as the feature saliency information accumulation unit 202 shown in FIG. 5. The operation of the feature saliency determination unit 250 is the same as the feature saliency determination unit 250 shown in FIG. 7. The feature saliency information that is output from the feature saliency determination unit 250 is input as the first feature saliency information to the feature saliency information integration unit 253. The feature saliency information that is output from the feature saliency information accumulation unit 202 is input as the second feature saliency information to the feature saliency information integration unit 253.

The feature saliency information integration unit 253 calculates feature saliency information to be supplied to the distinctive person determination unit 201 using the first feature saliency information and the second feature saliency information. Various methods may be used for this calculation. For example, the feature saliency information integration unit 253 uses the average of the both information as the feature saliency information to be supplied to the distinctive person determination unit 201. Further, at this time, the feature saliency information integration unit 253 may calculate the average after assigning a weight to one of them. For example, when the feature saliency information integration unit 253 calculates the feature saliency information by assigning a larger weight to the first feature saliency information, the feature saliency information integration unit 253 can calculate the feature saliency information, giving greater importance to a surveillance video. Alternatively, the feature saliency information integration unit 253 may use either one of the first feature saliency information or the second feature saliency information as the feature saliency information to be supplied to the distinctive person determination unit 201 depending on the time or a day of the week. The feature saliency information integration unit 253 outputs the calculated feature saliency information to the distinctive person determination unit 201.

The operation of the feature saliency determination unit 250 is the same as the feature saliency determination unit 250 shown in FIG. 7.

As described above, by integrating the accumulated feature saliency information and the dynamically calculated feature saliency information, the distinctive person selection unit 103 can make a selection of a distinctive person, taking advantage of the both.

The invention is not limited to these exemplary embodiments, and it will be understood by those of ordinary skill in the art that various changes in form and details may be made therein without departing from the spirit and scope of the present invention. Each process in the person tracking device according to the first to third exemplary embodiments described above may be implemented as a program operating in an arbitrary computer. The program can be stored and provided to the computer using any type of non-transitory computer readable medium. The non-transitory computer readable medium includes any type of tangible storage medium. Examples of the non-transitory computer readable medium include magnetic storage media (such as floppy disks, magnetic tapes, hard disk drives, etc.), optical magnetic storage media (e.g. magneto-optical disks), CD-ROM (Read Only Memory), CD-R, CD-R/W, and semiconductor memories (such as mask ROM, PROM (Programmable ROM), EPROM (Erasable PROM), flash ROM, RAM (Random Access Memory), etc.). The program may be provided to a computer using any type of transitory computer readable medium. Examples of the transitory computer readable medium include electric signals, optical signals, and electromagnetic waves. The transitory computer readable medium can provide the program to a computer via a wired communication line such as an electric wire or optical fiber or a wireless communication line.

The whole or part of the exemplary embodiments disclosed above can be described as, but not limited to, the following supplementary notes.

(Supplementary note 1)

A person tracking device comprising:

a person region information extraction means for detecting a person region where a person appearing in a video belongs, and generating person region information describing information of the person region;

an accompanying person determination means for identifying at least one accompanying person accompanying a tracking target person among persons included in the person region information based on the person region information and information specifying a tracking target person, and generating accompanying person information describing the accompanying person;

a distinctive person selection means for selecting a distinctive person having a salient feature using the person region information among the accompanying person specified by the accompanying person determination information, and generating distinctive person information describing the distinctive person; and a person tracking means for calculating a distinctive person tracking result being a tracking result for the distinctive person based on the person region information and the distinctive person information.

(Supplementary note 2)

The person tracking device according to Supplementary note 1, wherein the accompanying person information includes the information specifying the tracking target person, the distinctive person selection means calculates tracking target person relative position information representing a relative position between the tracking target person and the distinctive person, and the person tracking device further comprises a tracking result calculation means for calculating a tracking result for the tracking target person from the distinctive person tracking result and the tracking target person relative position information.

(Supplementary note 3)

The person tracking device according to Supplementary note 1 or 2, wherein the distinctive person selection means includes:

a feature saliency information accumulation means for accumulating feature saliency information describing information about saliency of a value of a feature; and a distinctive person determination means for calculating a feature of each of the accompanying person specified by the accompanying person information, calculating saliency of the feature of each of the accompanying person based on the feature saliency information, and selecting the distinctive person in relative descending order of the saliency.

(Supplementary note 4)

The person tracking device according to Supplementary note 1 or 2, wherein the distinctive person selection means includes:

a feature saliency determination means for calculating feature saliency information being information about saliency of a value of a feature based on a feature of a person described in the person region information; and a distinctive person determination means for calculating a feature of each of the accompanying person specified by the accompanying person information, calculating saliency of the feature of each of the accompanying person based on the feature saliency information, and selecting the distinctive person in relative descending order of the saliency.

(Supplementary note 5)

The person tracking device according to Supplementary note 1 or 2, wherein the distinctive person selection means includes:

a feature saliency determination means for calculating first feature saliency information being information about saliency of a value of a feature based on a feature of each person described in the person region information;

a feature saliency information accumulation means for accumulating second feature saliency information describing information about saliency of a value of a feature;

a feature saliency information integration means for calculating integrated feature saliency information by integrating the first feature saliency information and the second feature saliency information; and a distinctive person determination means for calculating a feature of each of the accompanying person specified by the accompanying person information, calculating saliency of the feature of each of the accompanying person based on the integrated feature saliency information, and selecting the distinctive person in relative descending order of the saliency.

(Supplementary note 6)

The person tracking device according to Supplementary note 4 or 5, wherein the feature saliency determination means sets higher saliency as frequency of appearance of the value of the feature is lower.

(Supplementary note 7)

The person tracking device according to Supplementary note 3, wherein the feature saliency information accumulation means changes the feature saliency information to be accumulated according to at least one of a current position, season and time.

(Supplementary note 8)

The person tracking device according to Supplementary note 5, wherein the feature saliency information integration means calculates an average from the first feature saliency information and the second feature saliency information and generates the integrated feature saliency information from the average.

(Supplementary note 9)

The person tracking device according to Supplementary note 5, wherein the feature saliency information integration means assigns a weight to at least one of the first feature saliency information and the second feature saliency information and calculates an average of the both information, and generates the integrated feature saliency information based on the average.

(Supplementary note 10)

The person tracking device according to any one of Supplementary notes 1 to 9, wherein the accompanying person determination means identifies information of the tracking target person included in the person region information based on the information specifying a tracking target person, and identifies the accompanying person based on the identified information.

(Supplementary note 11)

The person tracking device according to any one of Supplementary notes 1 to 9, wherein the accompanying person determination means groups persons located close to each other together into one group based on position information of each person included in the person region information, identifies a group where the tracking target person belongs based on the information specifying a tracking target person, and calculates the accompanying person information based on the identified group.

(Supplementary note 12)

A person tracking method comprising:

detecting a person region where a person appearing in a video belongs, and generating information person region information describing information of the person region;

identifying at least one accompanying person accompanying a tracking target person among persons included in the person region information based on the person region information and information specifying a tracking target person, and generating accompanying person information describing the accompanying person;

selecting a distinctive person having a salient feature using the person region information among the accompanying person specified by the accompanying person determination information, and generating distinctive person information describing the distinctive person; and calculating a distinctive person tracking result being a tracking result for the distinctive person based on the person region information and the distinctive person information.

(Supplementary note 13)

A non-transitory computer readable medium storing a person tracking program causing a computer to execute a process of tracking a person appearing in a video, the process comprising:

detecting a person region where the person appearing in the video belongs, and generating information person region information describing information of the person region;

identifying at least one accompanying person accompanying a tracking target person among persons included in the person region information based on the person region information and information specifying a tracking target person, and generating accompanying person information describing the accompanying person;

selecting a distinctive person having a salient feature using the person region information among the accompanying person specified by the accompanying person determination information, and generating distinctive person information describing the distinctive person; and calculating a distinctive person tracking result being a tracking result for the distinctive person based on the person region information and the distinctive person information.

This application is based upon and claims the benefit of priority from Japanese patent application No. 2011-070114, filed on Mar. 28, 2011, the disclosure of which is incorporated herein in its entirety by reference.

INDUSTRIAL APPLICABILITY

According to the present invention, it is possible to track a person using a surveillance camera and calculate the position of the person at a given time. This allows a given system to provide a tracking target person with the information in accordance with the position. Alternatively, when a tracking target person is a child, the present invention can be applied to a child tracking service that transmits a tracking result of a child to parents. As a matter of course, the present invention may be used for the purpose of tracking a specific person in a general security system.

REFERENCE SIGNS LIST

1 PERSON REGION DETECTION MEANS
2 VOXEL GENERATION MEANS
3 PERSON COLOR EXTRACTION MEANS
4 PERSON TRACKING MEANS
100 PERSON TRACKING DEVICE
101 PERSON REGION INFORMATION EXTRACTION UNIT
102 ACCOMPANYING PERSON DETERMINATION UNIT
103 DISTINCTIVE PERSON SELECTION UNIT
104 PERSON TRACKING UNIT
105 TRACKING RESULT CALCULATION UNIT
201 DISTINCTIVE PERSON DETERMINATION UNIT
202 FEATURE SALIENCY INFORMATION ACCUMULATION UNIT
250 FEATURE SALIENCY DETERMINATION UNIT
253 FEATURE SALIENCY INFORMATION INTEGRATION UNIT

The invention claimed is:

1. A person tracking device comprising:
a person region information extraction unit that detects a person region where a person appearing in a video belongs, and generates person region information describing information of the person region;
an accompanying person determination unit that identifies at least one accompanying person accompanying a tracking target person among persons included in the person region information based on the person region information and information specifying a tracking target person, and generates accompanying person information describing the at least one accompanying person;
a distinctive person selection unit that selects a distinctive person having a salient feature using the person region information and feature saliency information among the at least one accompanying person specified by the accompanying person information, and generates distinctive person information describing the distinctive person, the feature saliency information representing a degree of saliency of a value obtained as each feature representing a distinctive feature of a person; and
a person tracking unit that calculates a distinctive person tracking result being a tracking result for the distinctive person based on the person region information and the distinctive person information.

2. The person tracking device according to claim 1, wherein
the accompanying person information includes the information specifying the tracking target person,
the distinctive person selection unit calculates tracking target person relative position information representing a relative position between the tracking target person and the distinctive person, and
the person tracking device further comprises a tracking result calculation unit that calculates a tracking result for the tracking target person from the distinctive person tracking result and the tracking target person relative position information.

3. The person tracking device according to claim 1, wherein the distinctive person selection unit includes:
a feature saliency information accumulation unit that accumulates the feature saliency information; and
a distinctive person determination unit that calculates a feature of each of the at least one accompanying person specified by the accompanying person information, calculates saliency of the feature of each of the at least one accompanying person based on the feature saliency information, and selects the distinctive person in relative descending order of the saliency.

4. The person tracking device according to claim 1, wherein the distinctive person selection unit includes:
a feature saliency determination unit that calculates the feature saliency information based on a feature of a person described in the person region information; and
a distinctive person determination unit that calculates a feature of each of the at least one accompanying person specified by the accompanying person information, calculates saliency of the feature of each of the at least one accompanying person based on the feature saliency information, and selects the distinctive person in relative descending order of the saliency.

5. The person tracking device according to claim 1, wherein the distinctive person selection means includes:
a feature saliency determination unit that calculates first feature saliency information based on a feature of each person described in the person region information the first feature saliency information being the feature saliency;
a feature saliency information accumulation unit that accumulates second feature saliency information describing the feature saliency information;
a feature saliency information integration unit that calculates integrated feature saliency information by integrating the first feature saliency information and the second feature saliency information; and
a distinctive person determination unit that calculates a feature of each of the at least one accompanying person specified by the accompanying person information, calculates saliency of the feature of each of the at least one accompanying person based on the integrated feature saliency information, and selects the distinctive person in relative descending order of the saliency.

6. The person tracking device according to claim 4, wherein the feature saliency determination unit sets higher saliency as frequency of appearance of the value of the feature is lower.

7. The person tracking device according to claim 3, wherein the feature saliency information accumulation unit changes the feature saliency information to be accumulated according to at least one of a current position, season and time.

8. The person tracking device according to claim 5, wherein the feature saliency information integration unit calculates an average from the first feature saliency information and the second feature saliency information and generates the integrated feature saliency information from the average.

9. A person tracking method comprising:
detecting a person region where a person appearing in a video belongs, and generating person region information describing information of the person region;
identifying at least one accompanying person accompanying a tracking target person among persons included in the person region information based on the person region information and information specifying a tracking target person, and generating accompanying person information describing the at least one accompanying person;

selecting a distinctive person having a salient feature using the person region information and feature saliency information among the at least one accompanying person specified by the accompanying person information, and generating distinctive person information describing the distinctive person, the feature saliency information representing a degree of saliency of a value obtained as each feature representing a distinctive feature of a person; and calculating a distinctive person tracking result being a tracking result for the distinctive person based on the person region information and the distinctive person information.

10. A non-transitory computer readable medium storing a person tracking program causing a computer to execute a process of tracking a person appearing in a video, the process comprising:

detecting a person region where the person appearing in the video belongs, and generating person region information describing information of the person region;

identifying at least one accompanying person accompanying a tracking target person among persons included in the person region information based on the person region information and information specifying a tracking target person, and generating accompanying person information describing the at least one accompanying person;

selecting a distinctive person having a salient feature using the person region information and feature saliency information among the at least one accompanying person specified by the accompanying person information, and generating distinctive person information describing the distinctive person, the feature saliency information representing a degree of saliency of a value obtained as each feature representing a distinctive feature of a person; and calculating a distinctive person tracking result being a tracking result for the distinctive person based on the person region information and the distinctive person information.

* * * * *